United States Patent
Johnson

(10) Patent No.: US 10,035,217 B2
(45) Date of Patent: Jul. 31, 2018

(54) JOINT CONFIGURATION

(71) Applicant: BAE SYSTEMS plc, London (GB)

(72) Inventor: Darren Johnson, Cannock (GB)

(73) Assignee: BAE SYSTEMS plc, London (GB)

( * ) Notice: Subject to any disclaimer, the term of this patent is extended or adjusted under 35 U.S.C. 154(b) by 168 days.

(21) Appl. No.: 14/422,617

(22) PCT Filed: Aug. 13, 2013

(86) PCT No.: PCT/GB2013/052153
§ 371 (c)(1),
(2) Date: Feb. 19, 2015

(87) PCT Pub. No.: WO2014/029973
PCT Pub. Date: Feb. 27, 2014

(65) Prior Publication Data
US 2015/0224595 A1 Aug. 13, 2015

(30) Foreign Application Priority Data

Aug. 21, 2012 (GB) .................................. 1214878.9

(51) Int. Cl.
*B23K 20/12* (2006.01)
*B23P 6/00* (2006.01)

(52) U.S. Cl.
CPC .......... *B23K 20/122* (2013.01); *B23K 20/123* (2013.01); *B23K 20/124* (2013.01);
(Continued)

(58) Field of Classification Search
CPC .. B23K 20/122; B23K 20/123; B23K 20/124; B23K 20/125; B23K 20/126;
(Continued)

(56) References Cited

U.S. PATENT DOCUMENTS 3,934,107 A * 1/1976 Evertz .................... B22D 7/066
164/92.1
4,478,425 A * 10/1984 Benko .................. B61D 45/005
280/433

(Continued)

FOREIGN PATENT DOCUMENTS

JP 54006838 A 1/1979
JP H11342481 A 12/1999

(Continued)

OTHER PUBLICATIONS

Google Patents Translation of Japanese Publication JPH11342481A.*

(Continued)

*Primary Examiner* — Joshua J Michener
*Assistant Examiner* — Matthew J Gitlin
(74) *Attorney, Agent, or Firm* — Finch & Maloney PLLC

(57) ABSTRACT

The invention relates to a joint and welding configuration used during repair of metal and metal alloy plates specifically for providing a means of joining metal plates and filling voids in metal plates where access from one side is restricted. A joint arrangement suitable for repairing a void in at least one element, wherein said at least one element has a first surface and a second surface, wherein the thickness of the at least one element is at least 10 mm, further comprising two or more insert elements, each of said two or more insert elements each being friction stir welded at their abutted surfaces to said at least one element, characterized wherein said at least one element comprises at least one recess portion, wherein a Friction Stir Weld is caused from the direction of said first surface.

14 Claims, 6 Drawing Sheets

(52) U.S. Cl.
CPC .............. B23K 20/128 (2013.01); B23P 6/00 (2013.01); *Y10T 29/49739* (2015.01); *Y10T 403/47* (2015.01); *Y10T 403/477* (2015.01); *Y10T 403/478* (2015.01)

(58) Field of Classification Search
CPC ... B23K 20/127; B23K 20/128; Y10T 403/47; Y10T 403/473; Y10T 403/477; Y10T 403/478; Y10T 403/479; Y10T 29/49739; Y10T 29/49742; Y10T 29/4975; B23P 6/00
USPC ................................ 228/112.1, 2.1; 428/544
See application file for complete search history.

(56) References Cited

U.S. PATENT DOCUMENTS

| | | | | |
|---|---|---|---|---|
| 4,861,643 | A * | 8/1989 | Scollard | B64C 1/06 244/131 |
| 5,928,448 | A * | 7/1999 | Daws | B23P 6/00 156/92 |
| 5,971,252 | A * | 10/1999 | Rosen | B23K 20/1265 228/112.1 |
| 6,866,180 | B2 * | 3/2005 | Mahoney | B21D 5/02 148/564 |
| 7,022,938 | B2 * | 4/2006 | Tamura | B23K 26/123 219/121.64 |
| 7,732,033 | B2 * | 6/2010 | Van Aken | B23K 20/1225 228/112.1 |
| 7,780,062 | B2 * | 8/2010 | Swallow | B23K 20/122 228/112.1 |
| 7,866,532 | B1 * | 1/2011 | Potter | B23K 20/122 228/112.1 |
| 8,061,579 | B2 * | 11/2011 | Feng | B23K 20/1225 228/112.1 |
| 8,365,408 | B2 * | 2/2013 | Seo | B23K 20/122 165/169 |
| 8,678,268 | B1 * | 3/2014 | Obadtich | B23K 20/126 228/112.1 |
| 9,085,052 | B1 * | 7/2015 | Georgeson | B64F 5/40 |
| 9,095,927 | B2 * | 8/2015 | Seo | B23K 20/122 |
| 9,272,362 | B2 * | 3/2016 | Matlack | B23K 20/1215 |
| 2004/0041006 | A1 * | 3/2004 | Masingale | B23K 20/1265 228/112.1 |
| 2005/0087582 | A1 * | 4/2005 | Van Aken | B23K 20/122 228/112.1 |
| 2007/0044406 | A1 * | 3/2007 | Van Aken | B23K 20/1225 52/459 |
| 2007/0187469 | A1 * | 8/2007 | Chen | B23K 20/122 228/112.1 |
| 2008/0245517 | A1 * | 10/2008 | Ishikawa | B23K 20/1225 165/169 |
| 2009/0108051 | A1 | 4/2009 | Bamberg et al. | |
| 2009/0113708 | A1 | 5/2009 | Bamberg et al. | |
| 2010/0089976 | A1 * | 4/2010 | Szymanski | B23K 20/122 228/113 |
| 2011/0308059 | A1 | 12/2011 | Seo et al. | |
| 2012/0202089 | A1 * | 8/2012 | Hangai | B23K 20/1265 428/613 |
| 2015/0115019 | A1 * | 4/2015 | Pascal | B23K 20/125 228/112.1 |
| 2015/0290739 | A1 * | 10/2015 | Seo | B23K 20/122 228/112.1 |
| 2016/0250727 | A1 * | 9/2016 | Foucher | B23P 6/04 228/114.5 |
| 2016/0284449 | A1 * | 9/2016 | Haq | B32B 27/08 |

FOREIGN PATENT DOCUMENTS

| | | | |
|---|---|---|---|
| JP | 2001071153 A | | 3/2001 |
| JP | 2008307584 A | * | 12/2008 .......... B21D 39/021 |
| WO | 2008121216 A1 | | 10/2008 |
| WO | 2014029973 A1 | | 2/2014 |

OTHER PUBLICATIONS

International Preliminary Report on Patentability and Written Opinion received for Patent Application No. PCT/GB2013/052153, dated Mar. 5, 2015. 8 pages.
International Search Report and Written Opinion received for Patent Application No. PCT/GB2013/052153, dated Dec. 13, 2013. 10 pages.
GB Intellectual Property Office Search Report under Section 17(5) received for GB Patent Application No. 1214878.9 dated Nov. 27, 2012. 3 pages.

* cited by examiner

JOINT CONFIGURATION

The following invention relates to a welded joint configuration used during repair of metal and metal alloy plates specifically for providing a means of joining metal plates and filling voids in metal plates where access from one side is restricted.

Before the present invention is described in further detail, it is to be understood that the invention is not limited to the particular embodiments described, as such may, of course, vary. It is also to be understood that the terminology used herein is for the purpose of describing particular embodiments only, and is not intended to be limiting, since the scope of the present invention will be limited only by the appended claims.

According to the first aspect of the invention there is provided a joint arrangement suitable for repairing a void in at least one element, wherein said at least one element has a first surface and a second surface, wherein the thickness of the at least one element is at least 10 mm, further comprising two or more insert elements, each of said two or more insert elements each having a friction stir weld at their abutted surfaces to said at least one element, characterised wherein said at least one element comprises at least one recess portion wherein the Friction Stir Weld is caused from the direction of said first surface. Preferably said recess portion is a shoulder of width of at least 5 mm. This arrangement allows all the welds to be made from a single direction. Therefore it allows repair to an element which has limited access from one side, such as, for example, on the underside of a vehicle, vessel or craft, and it removes the need to remove a large amount of equipment from the inside of the vehicle, vessel or craft. Friction Stir Welding is a method of welding that substantially maintains the physical and mechanical properties of the elements it is applied to. Mechanical and blast tests have shown that Friction Stir Welding of metals and their alloys maintains approximately 90% of the original materials mechanical properties as well as producing welds which have very low defect levels. This is in contrast to other types of welding which are used for joining metal, such as, for example, Metal Inert Gas Welding which uses a filler material which has a significant impact on the physical properties of the weld and through mechanical and blast testing is known to maintain only approximately 60% of its strength properties. Whilst other forms of welding such as, for example Metal Inert Gas Welding, could be envisaged on the invention, Friction Stir Welding provides the highly preferred joining method. The improved weld strength properties make Friction Stir Welding suitable for applications where the structural integrity of the element needs to be maintained to tight tolerances, for example, armour plating on a vehicle or manufacture of high pressure vessels, such as, for example fuel tanks and cylinders. Friction Stir Welding can also be used for joining other metals and metal alloys as well as aluminium based composite materials.

The said at least one element and two or more insert elements may be selected from a metal or metal alloy preferably the metal may be selected from aluminium, titanium, steel or their alloys thereof.

The said at least one element comprises at least one recess portion or shoulder of width of at least 5 mm to enable the Friction Stir Weld tool to access the abutted said at least one element and said two or more insert elements.

By abutted surfaces, such as the example of the two or more insert elements, is meant a surface provided to the correct engineering tolerances, so as to be brought into contact to ensure weld strength.

The thickness of said at least one element is greater than 10 mm as forming recess portions in a material which has a thickness of less than 10 mm could affect the strength of the material.

In a further arrangement, stitching may be added to provide additional strengthening along the length of the joint. Stitching is the joining of by means of mechanical fixing, such as, for example a staple, of the said at least one element and said two or more insert elements prior to performing the Friction Stir Weld. The stitching may be particularly useful for repairs to thinner elements to minimise any distortion in the at least one element due to the welding process.

In a further arrangement the abutted surfaces may be arranged at an angle ($\alpha$) in the range of from 90° to 180°, preferably 90° to 160°, from the second surface of said at least one element. This allows the joint to be implemented to best satisfy the particular geometry of the repair, or to increase the contact surface area of the abutted surfaces.

In a further arrangement the abutted surfaces may be non-linear across the plane of the at least one element and at least two or more insert elements, such as, for example curved or sinusoidal arrangements may be used.

In a further arrangement the abutted surfaces between said two or more insert elements and/or said recess portion may comprise a plurality of co-locating lugs and voids. This allows locking of the two or more insert elements in place, to prevent movement during the weld process and to increase the shear strength of the final welded element.

In a further arrangement a joint comprising, a first insert element which is friction stir welded to at least one element, a second insert element located on top of said first insert element and within said recess portion of the at least one element, wherein said second insert element is friction stir welded to said at least one element, wherein one or more pins are inserted through said second insert element into said at least one element or said first insert element. This allows additional strengthening within the final repair, and to prevent movement during the weld process.

In a further arrangement there may be a layer between the said two or more insert elements such that the non-welded surfaces may comprise a layer, such as, for example an adhesive layer, a bonding layer, or a shock attenuating layer. The use of co-locating lugs and voids in combination with the layer provides additional surface area when adhesives and/or shock attenuators are implemented. The use of adhesive or bonding layers may provide additional strength to the repair.

In a further arrangement the abutted surfaces may be prepared before welding, such as, for example they may be mechanically and/or chemically cleaned, degreased and/or grit blasted. This promotes improved adhesion between the abutted surfaces and decreases the likelihood of defects in the welds.

In a further aspect of the invention there is provided a method of repairing a void in at least one element comprising a first surface and a second surface wherein the thickness of the element is at least 10 mm, preferably greater than the depth of a friction stir weld, the method comprising the steps of:

I. providing a first insert element such as to furnish an abutted fit in said void, wherein said first insert element has a thickness less than the thickness of said at least one element and the depth which is less than or equal to the depth of said friction stir weld, II. forming a recess portion in said at least one element,
III. friction stir welding the first insert element to the at least one element along the abutted surfaces from the direction of said first surface of said at least one element,
IV. providing a second insert element such as to furnish an abutted fit in said recess portion,
V. friction stir welding the second insert element to the at least one element along the abutted surfaces, wherein the friction stir welding is performed from the direction of said first surface of the at least one element; Steps II, IV and V may be repeated until the requirement of the repair is fulfilled. It should be noted that the recess portion can be formed prior to providing the first insert element. Preferably the combined thickness of the first and second insert elements are substantially the same thickness as the element.

In a further aspect of the invention there is provided a vehicle, vessel or craft comprising at least one repaired void according to the invention and method described herein.

In a further aspect of the invention there is provided a joint for repairing a void in at least one element, wherein the thickness of the at least one element is greater than the depth of a friction stir weld joint, comprising two or more insert elements, each of said two or more insert elements each having a friction stir weld at their abutted surfaces to said at least one element, characterised wherein said at least one element comprises at least one recess portion of width of at least the radius of a friction stir weld tool, wherein the Friction Stir Weld is caused from the direction of said first surface.

In a yet further aspect of the invention there is provided a joint suitable for joining two or more elements, wherein the thickness of the two or more elements is greater than the depth of a friction stir weld joint characterised wherein said at least two elements are abutted along the surface to be joined, and comprise at least one recess portion of width of at least the radius of a friction stir weld tool, wherein at least one insert element having a friction stir weld at the abutted surfaces of the recessed portion of said two or more elements.

An embodiment of the invention will now be described by way of example only and with reference to the accompanying drawings of which:

Figure 1:
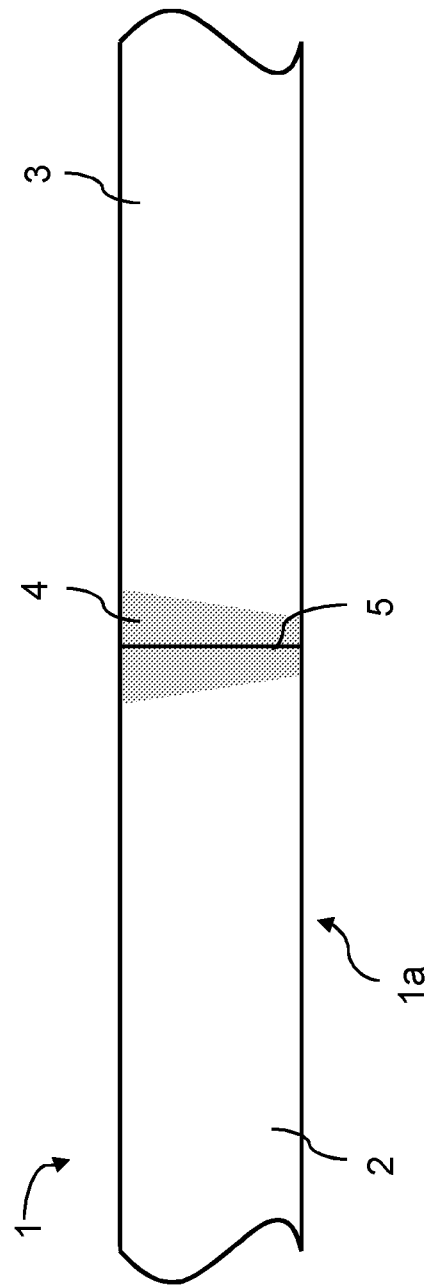
FIG. 1 shows a side view of two elements according to the prior art abutted together and welded.

Turning to FIG. 1 (Prior Art), there is provided a side view of a first element 2 and a second element 3 abutted together at an abutted surface 5 and welded together by a weld 4 along the entire length, which extends into the page, of the abutted surface 5. If the thicknesses of elements 2, 3 are greater than 25 mm then the weld must be carried out from both the top 1 and bottom 1a faces or the weld will not join through the entire thickness of the abutted surfaces.

Figure 2:
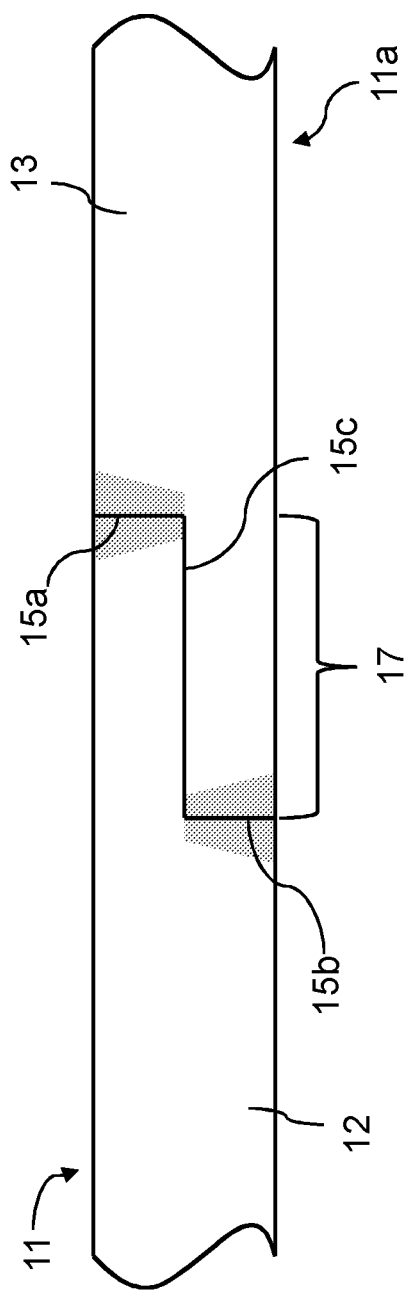
FIG. 2 shows a side view of two elements overlapping each other according to the prior art and welded from both sides.

FIG. 2 (Prior Art) shows a side view of a first element 12 and a second element 13 abutted together with an overlap arrangement 17 which is typically used where elements used are thicker than the depth of a weld. The elements 12, 13 have abutted surfaces 15a, 15b and 15c and are welded from both the first surface 11 and from the second surface 11a. Clearly if there is restricted access from the first surface 11, then only one weld via the second surface 11a could be made.

FIG. 3a shows a cross section of an element 132 which may be the floor pan of a tank which has bulging or corrosion 133, which needs to be repaired. The floor pan of the tank has internal workings 130 which prevents repair from inside the vehicle such that repairs can only be made from the exterior, first surface 131. FIG. 3b shows a cross section of said element 132 which has been prepared with recess portions or shoulders 233a and 233b larger than the removed portion of damage X. FIG. 3c shows a first insert element 336a of length X abutted against element 132, partially filling the void, which is then welded along the entire length of the abutted surfaces 335a and 335b, which extend into the page, by welds 334a and 334b respectively, which are made from the direction of the first surface 131. A second insert element 336b is inserted, and located within the recess portions 233a and 233b. The second insert element 336b is welded the entire length of the abutted surfaces 335c and 335d, which extends into the page, by the welds 334c and 334d respectively, which are made from the direction of the first surface 131. Optionally there may be a layer 335e such as an adhesive or shock attenuating layer located between the first insert element 336a, second insert element 336b and optionally the recess potions 233a and 233b.

Figure 3:
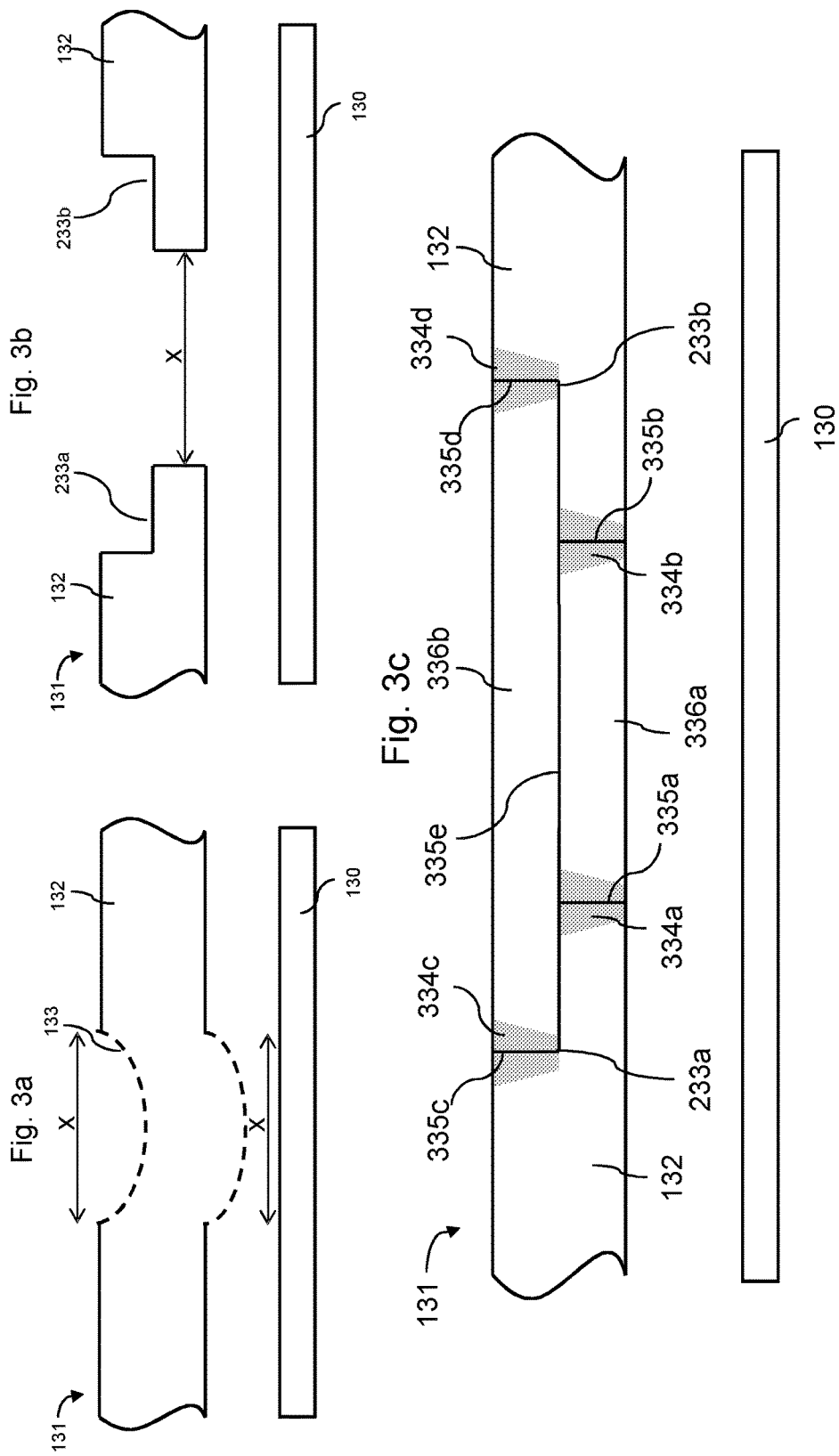
FIGS. 3a, 3b and 3c show a cross section of an element containing a void and a number of insert elements welded to the element filling the void.
Figure 4:
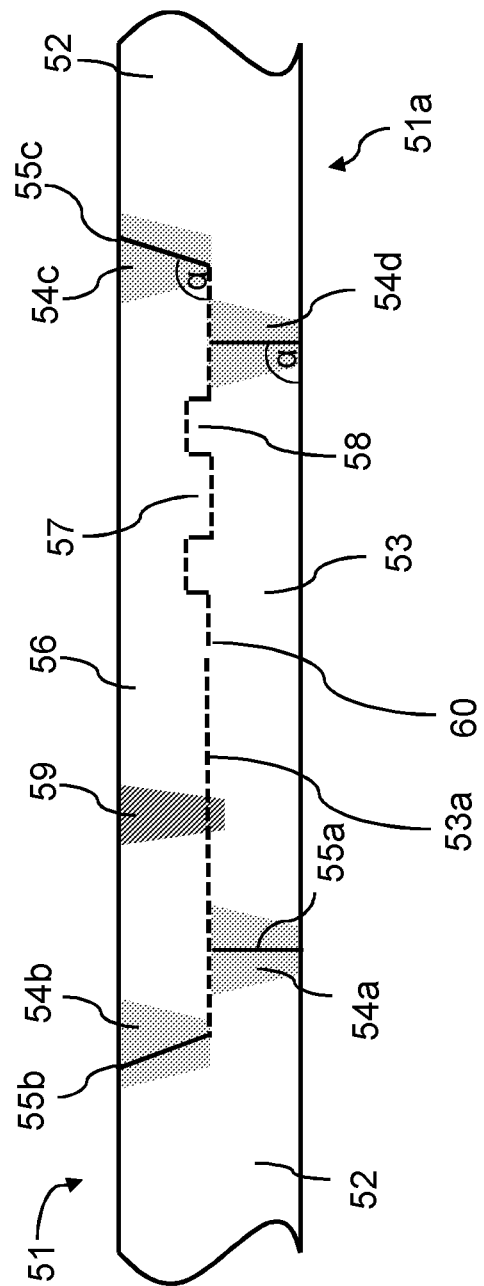
FIG. 4 shows a cross section of an element containing a void and a number of insert elements welded to the element filling the void.

FIG. 4 shows a cross section of an element 52 as in FIG. 3. A first insert element 53 is welded in place via welds 54a and 54d which joins element 52 and insert element 53. The surface 60 of the first insert element 53 is provided with one or more lugs 58 or voids 57, which co-locate with reciprocal voids or lugs on second insert element 56. The abutted surfaces 55b and 55c between the second insert element 56 and element 52 may have non-perpendicular contact surfaces to increase surface area. The element 52 is welded to the second insert element 56 along the entire length of the abutted surfaces 55b and 55c, into the page, from the direction of the first surface 51. Optionally there may be at least one pin 59 inserted through the second insert element 56 into the first insert element 53 from the direction of the first surface 51 to provide additional strengthening within the repair and to prevent movement during the weld process.

Figure 5:
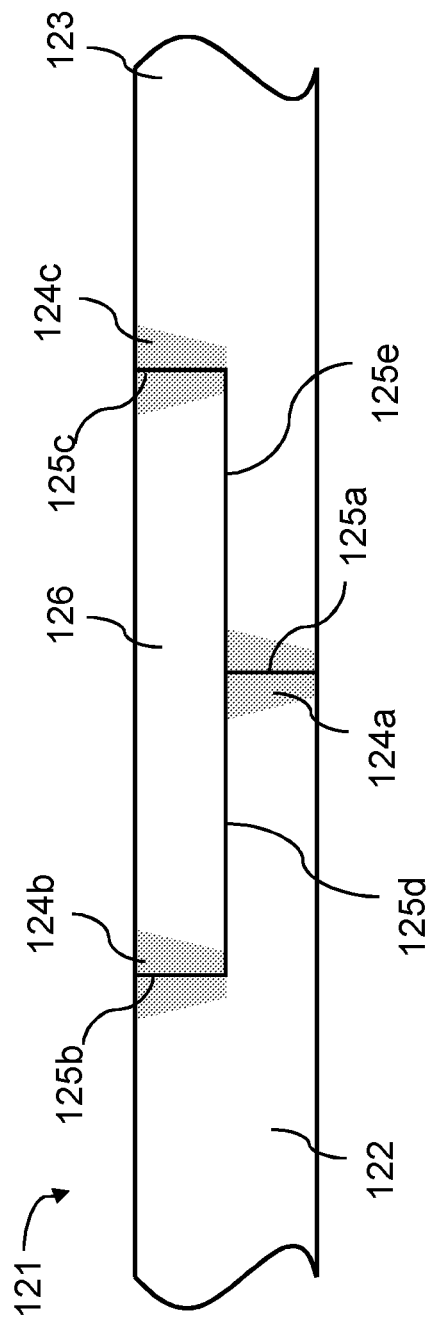
FIG. 5 shows a cross section of two elements and an insert element which has been welded to the two elements.

FIG. 5 shows a cross section of a first element 122 and a second element 123 which have to be joined, both of which have recess portions 125d and 125e respectively, where the insert element 126 is to be located. The elements 122 and 123 are abutted at surface 125a and are welded 124a along their entire length which extends into the page. An insert element 126 fills the recess portion in the elements 122 and 123. The insert element 126 is in contact with the elements 122 and 123 along abutted surfaces 125b, 125c, 125d and 125e and is joined to the elements 122 and 123 by two welds 124b and 124c along the entire length, which extends into the page. The welds 124a, 124b and 124c are all made from the first surface 121.

Figure 6:
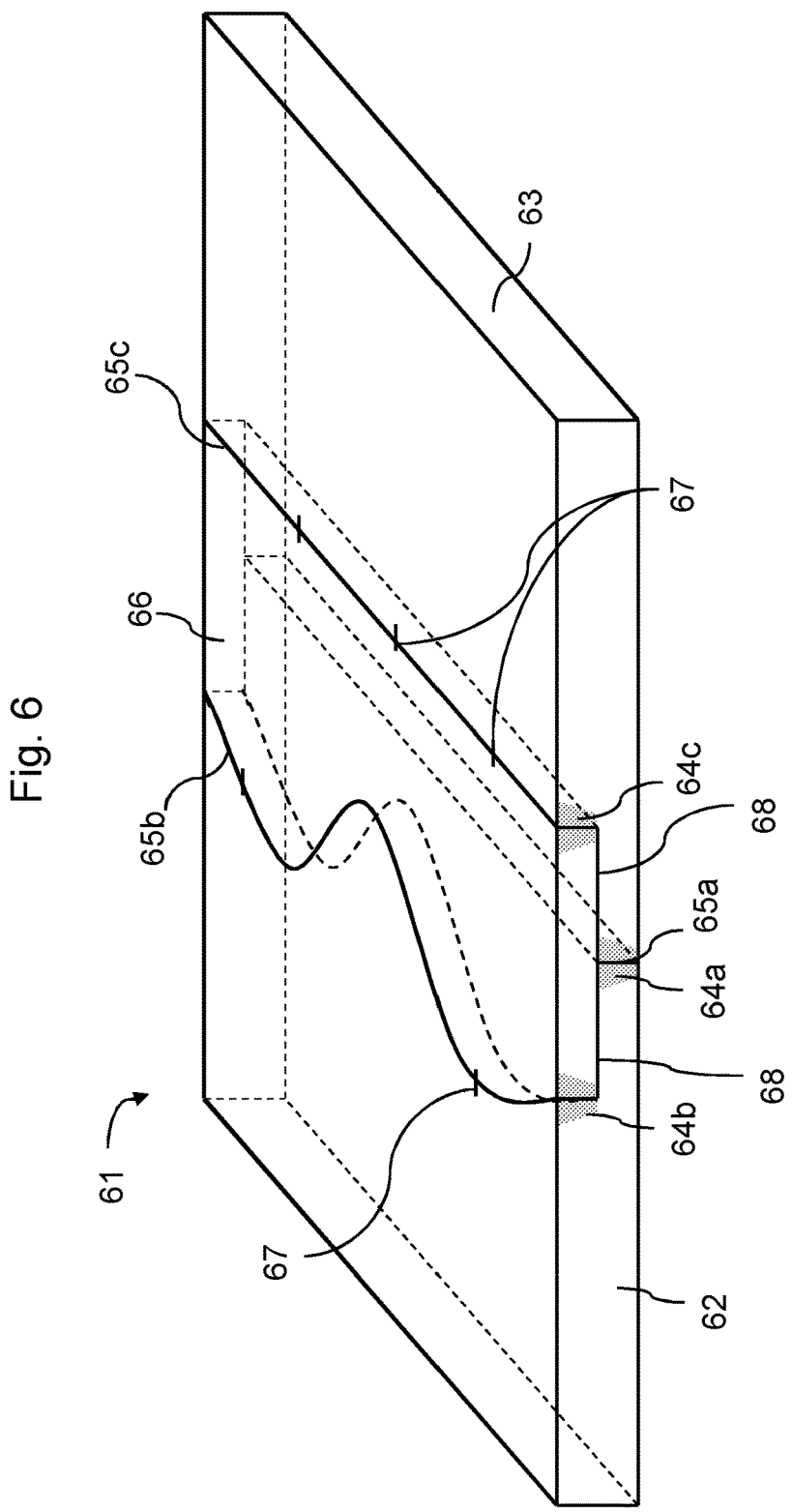
FIG. 6 shows a three dimensional view of two elements welded using Friction Stir Welding and an insert element with differing joint configurations.

FIG. 6 shows a first element 62 and a second element 63 which are to be joined both of which have a recess portion 68 where an insert element 66 is to be located. The elements 62 and 63 are brought together at abutted surface 65a and are welded 64a along their entire length. Insert element 66 is located on elements 62 and 63 and within recess portion 68 and is joined by two welds 64b and 64c along the entire length of the abutted surfaces 65b and 65c. The welds 64a, 64b and 64c are all made from the first surface 61. The join may be enhanced by stitching 67 at intervals along the length of the abutted surfaces. The abutted surfaces may be linear 65c or non-linear 65b, such as sinusoidal or curved as shown.

The invention claimed is:

1. A joint arrangement suitable for repairing a void in at least one element, the joint arrangement comprising said at least one element, a first insert, and a second insert,
wherein the first insert has a first end, a second end opposite the first end, a first upper surface between the first end and the second end, and a first lower surface between the first end and the second end,
wherein the second insert has a third end, a fourth end opposite the third end, a second upper surface between the third end and the fourth end, and a second lower surface between the third end and the fourth end,
wherein the first insert has a first friction stir weld at a first abutted surface between the first end of the first insert and said at least one element,
wherein the first insert has a second friction stir weld at a second abutted surface between the second end of the first insert and said at least one element,
wherein the second insert has a third friction stir weld at a third abutted surface between the third end of the second insert and said at least one element,
wherein the second insert has a fourth friction stir weld at a fourth abutted surface between the fourth end of the second insert and said at least one element,
wherein the first friction stir weld, the second friction stir weld, the third friction stir weld and the fourth friction stir weld are caused from the direction of said first upper surface of said at least one element, and
wherein the first upper surface of the first insert and the second lower surface of the second insert comprise a plurality of co-locating lugs and voids.

2. The joint according to claim 1 wherein at least one of said at least one element, said first insert and said second insert comprise at least one of a metal and a metal alloy.

3. The joint according to claim 1 wherein the joint further comprises stitching along a length of at least one of the first, second, third and fourth friction stir welded joints.

4. The joint according to claim 1 wherein at least one of the first, second, third and fourth abutted surfaces are arranged at an angle (a) in the range of from 90° to 180° from the second lower surface of said at least one element.

5. The joint according to claim 1,
wherein one or more pins are inserted through said second insert element into said at least one element or said first insert element.

6. A vehicle, vessel or craft comprising at least one repaired void according to claim 1.

7. A method of repairing a void in at least one element comprising a first upper surface and a second lower surface, the method comprising:
providing a first insert in said void, wherein the first insert has a first end, a second end opposite the first end, a first upper surface between the first end and the second end, and a first lower surface between the first end and the second end, wherein said first insert has a thickness less than the thickness of said at least one element and the depth which is less than or equal to the depth of said friction stir weld;
forming a recess portion in said at least one element;
providing a second insert in said recess portion, wherein the second insert has a third end, a fourth end opposite the third end, a second upper surface between the third end and the fourth end, and a second lower surface between the third end and the fourth end;
forming a plurality of co-locating lugs and voids on the first upper surface of the first insert and the second lower surface of the second insert;
friction stir welding the first and second ends of the first insert to the at least one element along the abutted surfaces from the direction of said first surface of said at least one element;
providing an adhesive layer on at least one of the first upper surface of the first insert and the second lower surface of the second insert, the adhesive layer positioned between a first friction stir weld at the first end of the first insert and a second friction stir weld at the second end of the first insert; and
friction stir welding the third and fourth ends of the second insert element to the at least one element along the abutted surfaces, wherein the friction stir welding is performed from the direction of said first surface of the at least one element.

8. A vehicle, vessel or craft comprising at least one repaired void repaired by a method according to claim 7.

9. A joint suitable for repairing a void in at least one element, wherein the thickness of the at least one element is greater than the depth of a friction stir weld joint, comprising a first insert and a second insert,
wherein the first insert has a first end, a second end opposite the first end, a first upper surface between the first end and the second end, and a first lower surface between the first end and the second end,
wherein the second insert has a third end, a fourth end opposite the third end, a second upper surface between the third end and the fourth end, and a second lower surface between the third end and the fourth end,
wherein the first insert has a first friction stir weld at a first abutted surface between the first end of the first insert and said at least one element,
wherein the first insert has a second friction stir weld at a second abutted surface between the second end of the first insert and said at least one element,
wherein the second insert has a third friction stir weld at a third abutted surface between the third end of the second inert and said at least one element,
wherein the second insert has a fourth friction stir weld at a fourth abutted surface between the fourth end of the second insert and said at least one element, wherein said at least one element comprises at least one recess portion of width of at least the radius of a friction stir weld tool, wherein the friction stir weld is caused from the direction of said first surface, and
wherein the first upper surface of the first insert and the second lower surface of the second insert comprise a plurality of co-locating lugs and voids.

10. The joint according to claim 9 wherein at least one of said at least one element, said first insert, and said second insert comprise at least one of are selected from a metal and a metal alloy.

11. The joint according to claim 9 wherein the joint further comprises stitching along the length of the first, second, third, and fourth friction stir welded joints.

12. The joint according to claim 9 wherein the first, second, third, and fourth abutted surfaces are arranged at an angle (α) in the range of from 90° to 180° from a surface of said at least one element.

13. The joint according to claim 9,
wherein one or more pins are inserted through said second insert element into said at least one element or said first insert element.

14. A vehicle, vessel or craft comprising at least one repaired void according to claim 9.

* * * * *